(12) United States Patent
Stading et al.

(10) Patent No.: US 11,188,205 B2
(45) Date of Patent: *Nov. 30, 2021

(54) CONFIGURABLE PATENT STRENGTH CALCULATOR

(71) Applicant: Innography, Inc., Austin, TX (US)

(72) Inventors: Tyron J Stading, Austin, TX (US); Clifford Scott Herrick, Austin, TX (US); John Gallner, Austin, TX (US)

(73) Assignee: Innography, Inc., Austin, TX (US)

( * ) Notice: Subject to any disclaimer, the term of this patent is extended or adjusted under 35 U.S.C. 154(b) by 206 days.

This patent is subject to a terminal disclaimer.

(21) Appl. No.: 16/154,305

(22) Filed: Oct. 8, 2018

(65) Prior Publication Data

US 2019/0243529 A1 Aug. 8, 2019

Related U.S. Application Data

(63) Continuation of application No. 14/281,645, filed on May 19, 2014, now Pat. No. 10,095,388.

(51) Int. Cl.
*G06F 3/0484* (2013.01)
*G06F 3/0482* (2013.01)
*G06F 16/31* (2019.01)

(52) U.S. Cl.
CPC ........ *G06F 3/04842* (2013.01); *G06F 3/0482* (2013.01); *G06F 16/313* (2019.01)

(58) Field of Classification Search
CPC ... G06F 3/04842; G06F 3/0482; G06F 16/313
See application file for complete search history.

(56) References Cited

U.S. PATENT DOCUMENTS

| | | | |
|---|---|---|---|
| 5,913,215 A * | 6/1999 | Rubinstein | G06F 16/951 707/708 |
| 6,370,527 B1 * | 4/2002 | Singhal | G06F 16/951 |
| 6,665,656 B1 | 12/2003 | Carter | |
| 7,599,938 B1 | 10/2009 | Harrison, Jr. | |
| 8,046,363 B2 | 10/2011 | Cha et al. | |
| 2002/0022974 A1 | 2/2002 | Lindh | |
| 2003/0135386 A1 | 7/2003 | Fine | |
| 2004/0103112 A1 | 5/2004 | Colson et al. | |
| 2005/0010515 A1 | 1/2005 | Woltjen | |
| 2006/0074864 A1 * | 4/2006 | Naam | G06F 16/9535 |
| 2006/0253586 A1 | 11/2006 | Woods | |
| 2008/0288489 A1 | 11/2008 | Kim | |
| 2010/0005094 A1 * | 1/2010 | Poltorak | G06F 40/205 707/E17.014 |
| 2011/0246379 A1 * | 10/2011 | Maddox | G06Q 40/06 705/310 |

* cited by examiner

*Primary Examiner* — William L Bashore
*Assistant Examiner* — Gregory A Distefano
(74) *Attorney, Agent, or Firm* — Fiala & Weaver P.L.L.C.

(57) ABSTRACT

A system includes a processor and a memory accessible to the processor. The memory stores instructions that, when executed, cause the processor to provide a graphical user interface (GUI) including a plurality of user-selectable elements accessible by a user to select a patent strength calculator from a plurality of patent strength calculators, to edit a patent strength calculator, or to create a new patent strength calculator. The memory further stores instructions that, when executed, cause the processor to apply a selected patent strength calculator to a list of documents to determine a patent strength score for each patent of the list of documents.

20 Claims, 9 Drawing Sheets

216 ─┐

Selected: 0 Patents

| ID | Title | Strength Score (Innog) | Strength Score (IP Score) |
|---|---|---|---|
| US20090194495 | Saddle Rack | 23 | 212 |
| US20070158285 | Saddle Rack | 70 | 214 |
| US3780971 | Collapsible Saddle Rack | 55 | 42 |
| US8141720 | Saddle Rack | 76 | 32 |
| US20130209160 | Device for Guiding a Saddle Pole | 15 | 499 |
| US20080099350 | Storage Box and Rack | 27 | 415 |
| US5362078 | Combination saddle carrier... | 51 | 111 |
| US454153 | Saddle Rack | 0 | 0 |
| US8529184 | Saddle Rack Lift Mechanism | 48 | 22 |

220   222   402   404

CONFIGURABLE PATENT STRENGTH CALCULATOR

CROSS-REFERENCE TO RELATED APPLICATION(S)

The present disclosure is a continuation of and claims priority to U.S. patent application Ser. No. 14/281,645 filed on May 19, 2014 and entitled "Configurable Patent Strength Calculator," which is incorporated herein by reference in its entirety.

FIELD

The present disclosure is generally related to systems for evaluating patent strength, and more particularly to a system including a user-configurable patent strength calculator.

BACKGROUND

Assessing the value of a patent can be difficult, particularly for a newly issued patent or for a pending application. Some attempts have been made to automate patent valuations, such as the "Claims Originality Analysis (COA)" software system. However, assessing a patent's strength or value can be a difficult task for an expert, let alone, for an automated software system. Such valuations may depend on the assignee, the patent portfolio of the assignee, and other complex economic factors, in addition to the text of the patent.

SUMMARY

In some embodiments, a system includes a processor and a memory accessible to the processor. The memory stores a patent strength calculator and instructions that, when executed, cause the processor to provide a graphical user interface (GUI) including a plurality of user-selectable elements accessible by a user to select a patent strength calculator option from a plurality of patent strength calculators. The memory further stores instructions that, when executed, cause the processor to receive user input corresponding to the first GUI indicating a selection of the patent strength calculator and apply the patent strength calculator to a list of documents in response to the user input to determine a patent strength score for each patent of the list of documents.

In other embodiments, a system includes a processor and a memory accessible to the processor. The memory stores a patent strength calculator and instructions that, when executed, cause the processor to provide a graphical user interface (GUI) including at least one user-selectable option accessible by a user to access a formula associated with a selected patent strength calculator. The memory further stores instructions that, when executed, cause the processor to receive a user input corresponding to the at least one user-selectable option to produce an adjusted patent strength calculator in response to the user input and apply the adjusted patent strength calculator to a list of documents in response to the user input to determine a patent strength score for each patent of the list of documents.

In still other embodiments, a system includes a processor and a memory accessible to the processor. The memory stores instructions that, when executed, cause the processor to provide a graphical user interface (GUI) including at least one user-selectable option accessible by a user to create a patent strength calculator. The memory further includes instructions that, when executed, cause the processor to receive a user input defining the patent strength calculator and apply the patent strength calculator to a list of documents in response to the user input to determine a patent strength score for each patent of the list of documents.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
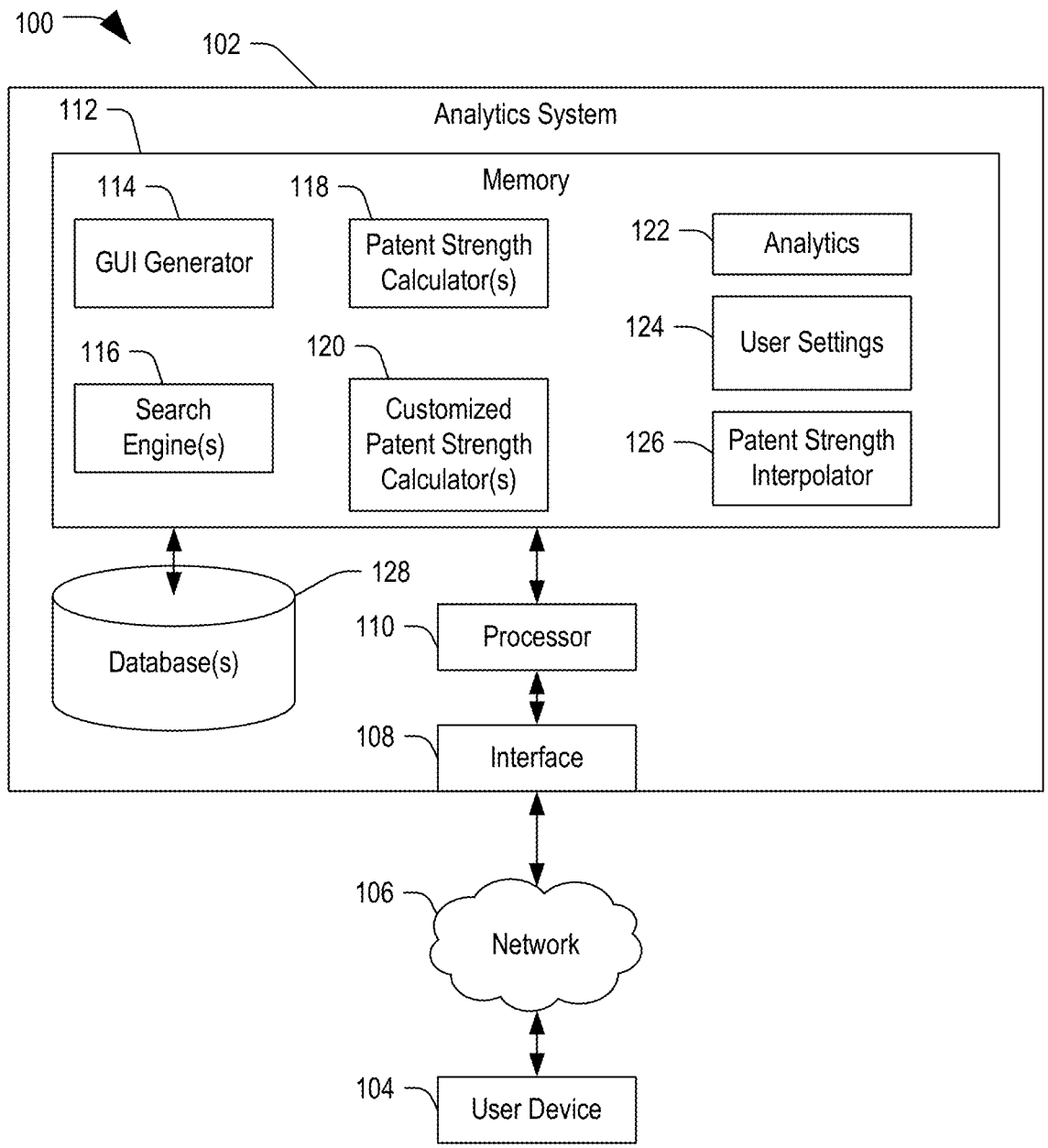
FIG. 1 is a block diagram of a system to provide a configurable patent strength calculator according to some embodiments.

Embodiments of systems, GUIs, and methods are described below that allow a user to customize a patent strength calculator. In some embodiments, the GUI may be a standalone application. In some embodiments, the GUI may be a user interface rendered within an Internet browser application executing on a user device. In some embodiments, the system may provide a GUI that includes a list of a plurality of patent strength calculators from which the user may select, and the GUI may include user-selectable options to allow the user to specify how the patent strength score(s) may be presented. As used herein, the term "patent strength score" refers to a numeric value assigned to a patent based on various attributes of the patent. In some embodiments, the patent strength score may be indicative of a probability that the patent right will be upheld by the court and thus that the patent may be found to be enforceable against an infringer or potential licensee. In some embodiments, the patent strength score may vary across a numeric range between zero and one hundred, which numeric range corresponds to a strength spectrum from weak (zero) to strong (100).

Patent strength or patent valuation algorithms may be applied to determine a patent strength score. Such algorithms may calculate the patent strength score based on a variety of factors including, for example, the number of claims in a patent; the number and types of references cited in a patent; the number of times the patent is cited in other patents; the dispersion of citations made across different patent classes; the number of different International Patent Classifications (IPCs) assigned to a patent application; the number of words in each independent claim; the location of the patent owner; other factors; or any combination thereof. How such information may be incorporated into the patent strength calculation may vary from one patent strength algorithm to the next. Further, in some embodiments, the number of factors may vary from one patent strength algorithm to the next.

Patent claims describe the scope of protection that has been granted by the patent. More claims may indicate broader protection for the patented technology. References are the technology and prior art that a patent stands upon. More references may indicate a broader technology base and consequently a stronger patent. Further, citations may indicate that this patent is used as prior art. The more frequently a given patent is cited, the more foundational—and therefore valuable—it may be. Further, research indicates that litigation correlates strongly with patent strength. Strong patents are often defended by their owners. Expired patents aren't as strong or valuable. Other factors may also be considered.

In some embodiments, in addition to allowing the user to configure the presentation of the patent strength score, the GUI may further present at least one user-selectable element that may be accessed by a user to edit a selected patent strength calculator to provide a custom patent strength calculator. In some embodiments, one or more patent strength calculators (at least one of which may be customized) may be applied to a set of documents (such as a set of search results) that include a plurality of patents to produce a patent strength score for each of the patents. In some embodiments, the system may calculate multiple patent strength scores (one for each patent strength calculator) for each patent. In some embodiments, the system may provide the multiple scores in a GUI together with a list of the set of documents. In some embodiments, the system may selectively combine, average, or otherwise interpolate the multiple scores to produce a composite patent strength score for each patent. In some embodiments, the user may configure the patent strength calculator to customize the calculations, to specify how the patent strength scores will be presented, or both. One possible example of a system to provide a configurable patent strength calculator is described below with respect to FIG. 1.

FIG. 1 is a block diagram of a system 100 to provide a configurable patent strength calculator according to some embodiments. The system 100 includes an analytics system 102 configured to communicate with a user device 104 through a network 106. The user device 104 may be a computing device, such as a laptop computer, a tablet computer, a smart phone, another computing device, or any combination thereof. In some embodiments, the analytics system 102 may be a computer server that includes one or more processors. In some embodiments, the analytics system 102 may be a computing device, such as a laptop computer, a tablet computer, a smart phone, another computing device, or any combination thereof, which may be configured to allow a user to interact with one or more user-selectable elements to customize a selected patent strength calculator.

The analytics system 102 includes an interface 108 configured to couple to the network 106. The analytics system 102 further includes a processor 110 coupled to the interface 108 and includes a memory 112 that is accessible to the processor 110. The memory 112 may be a non-volatile memory, such as a hard disc or flash memory configured to store instructions and data even after power is removed. The memory 112 is configured to store instructions that, when executed, cause the processor 110 to provide a GUI including one or more user-selectable elements to the user device 104 through the network 106. The user-accessible elements of the GUI may be accessed by a user to select one or more patent strength calculators from a plurality of patent strength calculators 118, to specify how patent strength scores should be displayed, and optionally to customize one or more of the patent strength calculators.

The memory 112 includes a GUI generator 114 that, when executed, causes the processor 110 to generate the GUI and to include the user-selectable elements within the GUI. The memory 112 further includes one or more search engines 116 (and/or one or more interfaces to existing search engines) that, when executed, cause the processor 110 to search one or more data sources for search results that relate to information provided by the user. The memory 112 also includes a plurality of patent strength calculators 118. When executed, each of the patent strength calculators 118 processes each patent of a set of patent documents (which may be a set of search results or a set of documents uploaded by the user) to determine a patent score indicative of the patent's strength relative to other patents within the patent documents. Each patent strength calculator 118 uses information derived from the patent and optionally other information related to the patent to calculate the patent strength. Further, each patent strength calculator 118 may use its own formula to determine the patent strength, which formula may use similar data but which may weight the data differently, producing different scores for the same patent.

The memory 112 may further include customized patent strength calculators 120, which may be derived from one of the patent strength calculators 118 based on modifications made by the user. Alternatively, the customized patent strength calculators 120 may include a proprietary patent strength calculator imported by or created by the user.

The memory 112 may include analytics instructions 122 that, when executed, cause the processor 110 to process the search results to extract data from the search results, retrieve data corresponding to the search results, and to process the data to produce correlated search results, which may be presented to the user. Such correlated search results may include litigation information corresponding to each patent, corporate financial data, and other information retrieved and correlated to each patent document and/or to the assignee of the patent document.

The memory 112 may further include user settings 124, which may specify which of the patent strength calculators 118 and/or customized patent strength calculators 120 to apply to search results (or to a set of documents) as well as how the patent strength score should be presented. For example, multiple patent strength calculators may be applied to a set of documents and the resulting scores may be presented as separate data items within a table, as separate data items within popups when the user moves a pointer over the particular patent document in a list, as a combined (composite) score, or any combination thereof. The memory 112 may further include a patent strength interpolator 126, which may be used to average, combine, or otherwise interpolate a composite patent strength score based on the patent strength scores produced using multiple patent strength calculators. The memory 112 may also include or be coupled to one or more databases 128. The databases 128 may include curated (pre-processed) data. Further, the user device 104 may include proprietary data and the user device 104 may include a local search component that allows the user to search local data as well as interact with the analytics system 102 to produce a composite set of search results. In some embodiments, the analytics system 102 may allow the user to upload a set of documents or a document list.

In some embodiments, the analytics system 102 computes each user query across tens of millions of patents in sub-second response times. A given formula (similar to a spreadsheet formula) may be applied to every matching patent in the databases 128. Furthermore, each patent result may be reordered and re-ranked according to that value in real-time, and may be returned with the computed score.

In some embodiments, the analytics system 102 may receive one or more search results and may utilize one or more of the patent strength calculators 118 and 120 to calculate one or more patent strength scores for each search result. The system 102 may utilize the GUI generator 114 to produce a GUI including the search results and the associated patent strength scores and may provide the GUI to a user device 104 through a network 106. In some embodiments, the analytics system 102 may receive a set of documents (or a list of document identifiers) and may utilize one or more of the patent strength calculators 118 and 120 to calculate one or more patent strength scores for each document. In some embodiments, to determine the value of a patent, the analytics system 102 may determine the scope of the patent's claims, the products or services covered by the patent's claims, and the economic benefit associated with the product or service. The claim scope and the corresponding products/services may be determined based on semantic analysis performed by the processor 110 executing the analytics instructions 122, which may include a learner module, neural network, artificial intelligence engine, other instructions, or any combination thereof. The processor 110 executing the analytics instructions 122 may extract various data and metadata from a patent, may retrieve related information, and may populate a pre-defined patent strength algorithm with the data, the metadata, the retrieved related information, or any combination thereof to determine a patent strength score.

In some embodiments, patent strength may be determined based, at least in part, on the number of patent claims, the number of words in each claim, the number of citations cited in the reference, the number of other documents that cite to the patent, any litigation involving the patent, file history information (such as number of amendments, etc.), the remaining life of the patent, and other information. Much of that information may be readily determined by the analytics system 102 for use in connection with one or more selected patent strength calculators 118 and 120 to determine a patent strength score. However, regardless of the data used to determine the patent strength score, the valuation of patent strength can also include subjective view points, in which some of the variables may be less important than others. The analytics system 102 allows a user to modify the patent strength calculator (or to modify any selected one or more of the patent strength calculators). The modified patent strength calculator may then be applied to data from a patent to determine its patent strength score.

In some embodiments, the analytics system 102 allows the user to model approximations and values for patent strength based on a variety of approaches. Further, the system 102 allows the user to model different approaches in a single, simultaneous patent strength calculation operation. Additionally, the fields and operators make it possible for the user to model a variety of variables, including forward citations, backward citations, the age of the patent, the size of the company (revenue), the number of patents of a company, cooperative patent classifications (CPC), the number of inventors, Patent Office decision length of time, number of claims, number of words in the claims, Industry, Institute of Printed Circuits benchmarks, maintenance fee dates, litigation data, breadth of industries, time since grant, jurisdiction, assignment status, reassignment, application weighting, weighting of citations by country, other factors, or any combination thereof.

In some embodiments, the analytics system 102 provides a GUI that allows the user to write a formula (can be as simple as a single variable—e.g., prioritizing forward citations). Second, suggestions may be provided that can be used and/or modified by the user.

Customized patent strength calculators can be shared within an organization as "corporate-approved ranking algorithms". This allows users within a company to share patent strength calculators and to "speak the same language" with respect to patent value. Custom patent strength algorithms can be defined to: 1) Identify Patents owned by Non-Practicing Entities (NPEs); 2) evaluate purchase/license opportunities; 3) supplement monetization efforts; 4) assist in making maintenance decisions; 5) assist in strategic patenting decisions; 6) assist in inventor recognition, rewards and retention efforts; 7) assist in product and risk decisions; 8) generate competitive intelligence; 9) identify other information; or any combination thereof.

In some embodiments, the analytics system 102 may provide one or more GUIs accessible by a user to modify an existing patent strength calculator or to create a patent strength calculator. One possible example of a GUI that may be accessed by a user to modify a patent strength calculator is described below with respect to FIG. 2.

Figure 2:
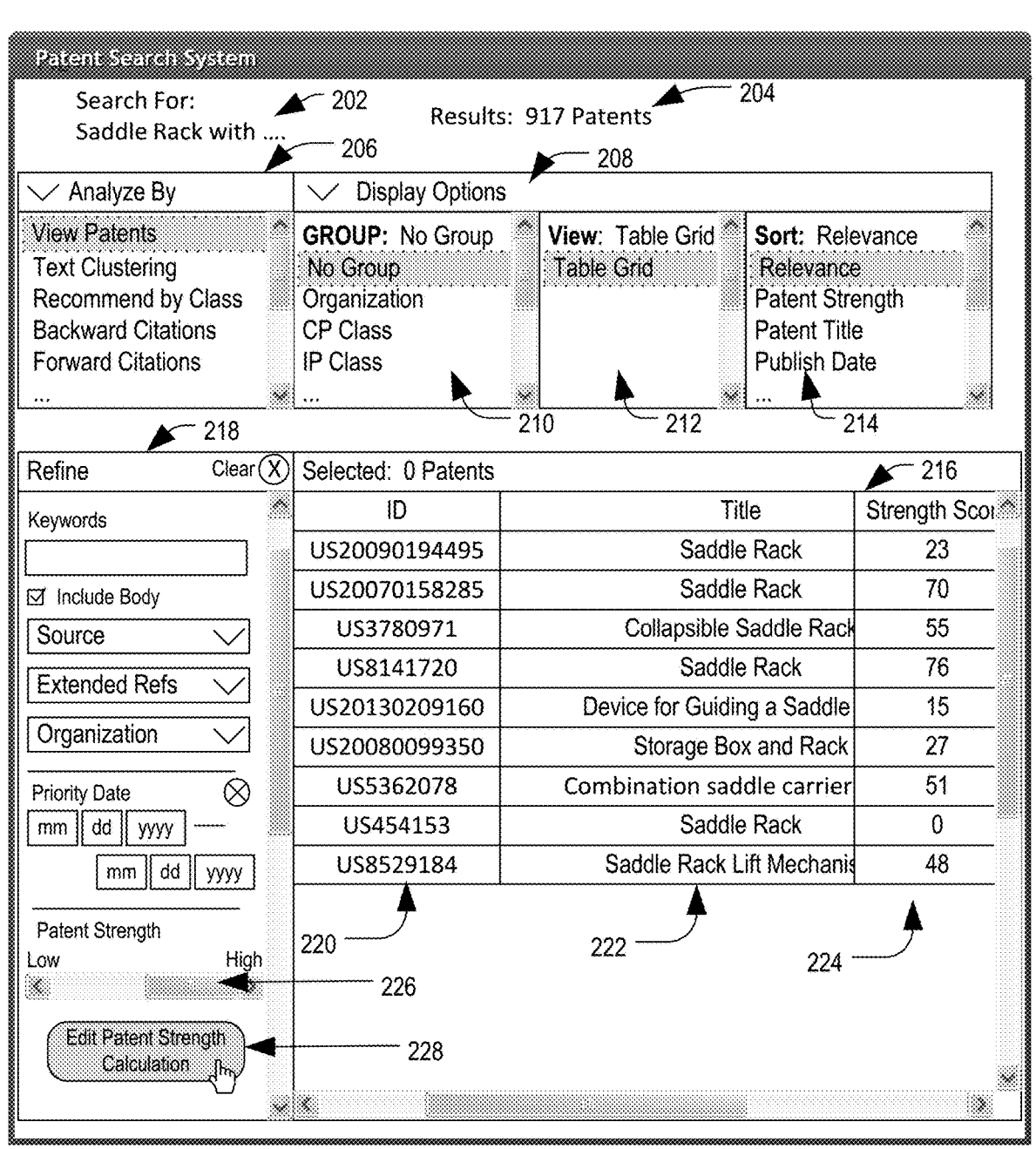
FIG. 2 is a diagram of a GUI including a user-selectable element accessible by a user to access the configurable patent strength calculator according to some embodiments.

FIG. 2 is a diagram of a GUI 200 including a user-selectable element 228 accessible by a user to access the configurable patent strength calculator according to some embodiments. The GUI 200 includes search terms 202 used to retrieve search results as well as an indicator 204 indicating the number of search results.

The GUI 200 further includes a plurality of user-selectable elements, including clickable options, text inputs, slider bars, and buttons to allow the user to refine the search results and optionally to alter the presentation of the search results (such as by changing the visualization). While the example suggests a set of search results, it is also possible to present a list of documents based on information uploaded by the user. The GUI 200 includes an Analyze panel 206, a Display Options panel 208, a Refine panel 218, and a Results panel 216. The Analyze panel 206 includes multiple selectable options including a "View Patents" option (which is selected), a "Text Clustering" option, a "Recommend by Classification" option, a "Backward Citations" option, a "Forward Citations" option, and other options (not shown). Selection of the "View Patents" option causes the search results to be displayed in a list form within the Results panel 216. Selection of other options within the Analyze panel 206 may cause the results to be clustered, related by classification, or related by citations. In another example, the Results panel 216 may present a list of the patent documents uploaded by the user.

The Display Options panel 208 includes a Group option panel 210, a View Option panel 212, and Sort panel 214.

Since the "View Patents" option is selected, the Group Option 210 may allow the user to select groupings by organization, corporate classification, an Intellectual Property (IP) classification, or another group. The View Option panel 212 may include a table grid view (which is selected); however, depending on the selected option within the Analyze panel 206, the options within the View panel 212 may vary, such as to provide a "Pie Graph" or other options. The Sort panel 214 may include options to sort by "Relevance", "Patent Strength", "Patent Title", "Publication Date" or other attributes. In the illustrated example, the "Relevance" option is selected within the Sort panel 214, which causes the list of documents within the Results panel 216 to be sorted according to a relevance factor indicating a statistical relevance between the search terms and the patent document.

The Results panel 216 includes patent documents organized in a table format including a patent identifier column 220, a title column 222, and a strength score column 224. The results in the Results panel 216 are shown in relevance order, which does not necessarily correspond to the calculated patent strengths shown in the strength score column 224.

The GUI 200 further may include a Refine panel 218, which may include multiple user-selectable elements including text boxes, check boxes, pull-down menus, date fields, slider elements (such as patent strength slider 226), clickable graphics, and buttons (such as the "Edit Patent Strength Calculation" button 228). The user may interact with elements of the Refine panel 218 to narrow the search results presented within Results panel 216. The user may also click the Edit Patent Strength Calculation button 228 to access a GUI or window through which the user may make adjustments to the patent strength calculations, including selecting between different patent strength calculators and altering the relative importance of various factors within a selected patent strength calculator to provide a customized patent strength calculator. In some embodiments, the GUI 200 may provide options for the user to drag and drop attributes (such as "Number of Claims", "Number of Words in the Independent claims", "Number of Citations", and so on, from a panel into a "Customize Patent Strength Calculator" panel and then assign weights to each factor to produce a customized patent strength calculator, which the user may name so that it can be saved and accessed as desired.

In some embodiments, selection of the "Edit Patent Strength Calculation" button 228 may cause the analytics system 102 to provide a GUI through which the user may customize the patent strength calculations. In some embodiments, selection of the "Edit Patent Strength Calculation" button 228 may cause the GUI to provide a pop up or a second window through which the user may adjust the patent strength calculations. One possible example of embodiments of the GUI that allows the user to adjust the patent strength calculations is described below with respect to FIG. 3.

Figures 3, 4:
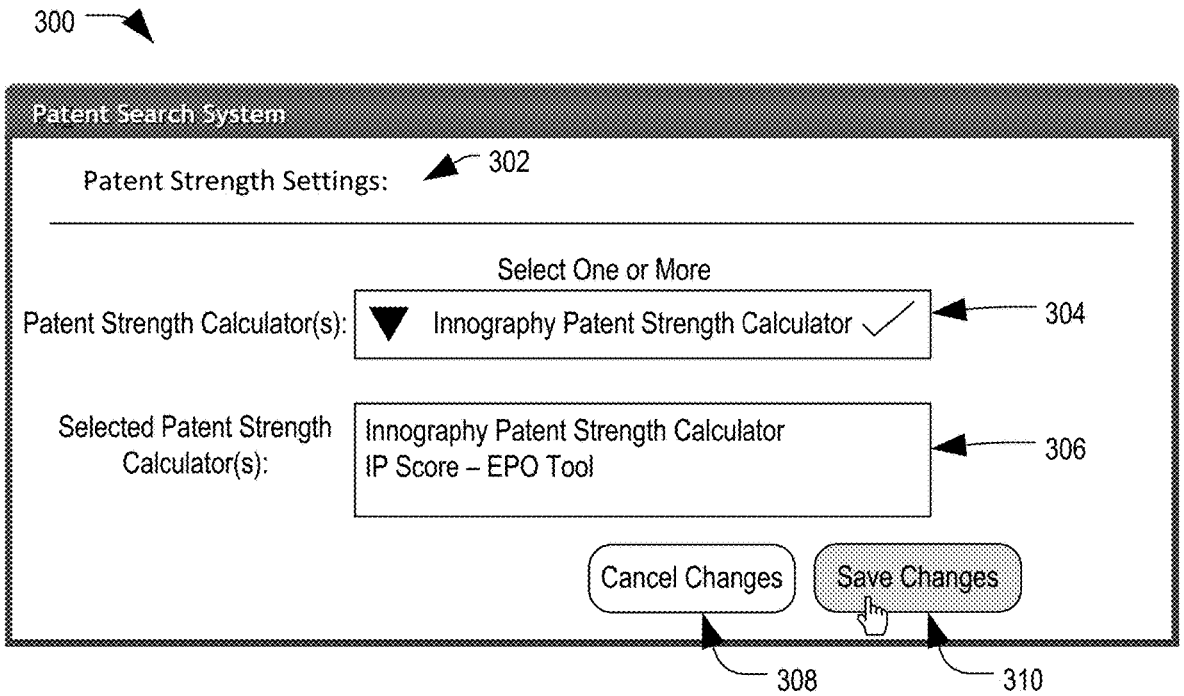
FIG. 3 is a diagram of a GUI including a user-selectable element accessible by a user to select a patent strength calculator from a list according to some embodiments.
FIG. 4 is a table depicting a list of documents from the GUI of FIG. 2 including patent strength scores of the documents using selected patent strength calculators according to some embodiments.

FIG. 3 is a diagram of a GUI 300 including a user-selectable element 304 accessible by a user to select a patent strength calculator from a list according to some embodiments. The GUI 300 includes patent strength settings 302, which the user may access by selecting one or more patent strength calculators from a user-selectable element (pull-down menu) 304. The user may select multiple calculators, and the selected patent strength calculators may be displayed within a text field 306. The GUI 300 may further include check box 308 and 310 that may be accessed by the user to select whether the resulting patent strength scores are to be displayed in separate columns, as a combined score, or both, for example, within the Results panel 216.

In some embodiments, the user may select multiple patent strength calculators using user-selectable element 304 and may specify a desired display setting via check boxes 308 and 310. The user may then interact with button 312 to cancel changes or with button 314 to save the changes. Some embodiments of a table, such as that shown in the results panel 216 of FIG. 2, are described below with respect to FIG. 4 that may include multiple patent strength scores.

FIG. 4 is a table depicting a list of documents in Results panel 216 from the GUI 200 of FIG. 2 including patent strength scores of the documents using selected patent strength calculators (depicted in FIG. 3) according to some embodiments. Results panel 216 includes a patent strength (Innography®) column 402 presenting patent strength scores calculated using Innography's® PATENT-STRENGTH™ calculator. Results panel 216 further includes a patent strength (IP Score) column 404 presenting patent strength scores calculated using the IP Score calculator.

Referring again to FIG. 3, the user selected check box 308 indicating a preference to have the patent strength scores presented in separate columns, which preference is reflected by columns 402 and 404. The user may have also selected check box 310 indicating a preference for a composite score, which would have caused the system to provide an additional column (not shown) to provide a composite score. In some embodiments, the order with which the documents are presented may be based on a relevance score. Alternatively, the user may click on a column heading to reorder the results according to one of the attributes, such as the patent strength score of column 402 or column 404.

In some embodiments, the different patent strength calculators may provide different scoring ranges, which may have different meanings from calculator to calculator. In some embodiments, the composite score may be normalized over the range of values and the resulting normalized values may be averaged to determine a composite score. For example, if a first scoring system has a range of zero to one hundred and a second scoring system has a range of zero to one thousand, the system may scale the second scoring system to a range of zero to one hundred, add the scores together, and average them to determine a composite score. In other examples, the scoring systems may vary such that system may need to interpolate a composite patent strength score based on the various patent strength scores.

In some embodiments, the GUI may present the user with additional options for customizing the patent strength calculators. For example, the GUI may include one or more user-selectable options to allow the user to selectively adjust the relative importance of a selected attribute of the patent strength calculator. One possible example of such a GUI is described below with respect to FIG. 5, according to some embodiments.

Figure 5:
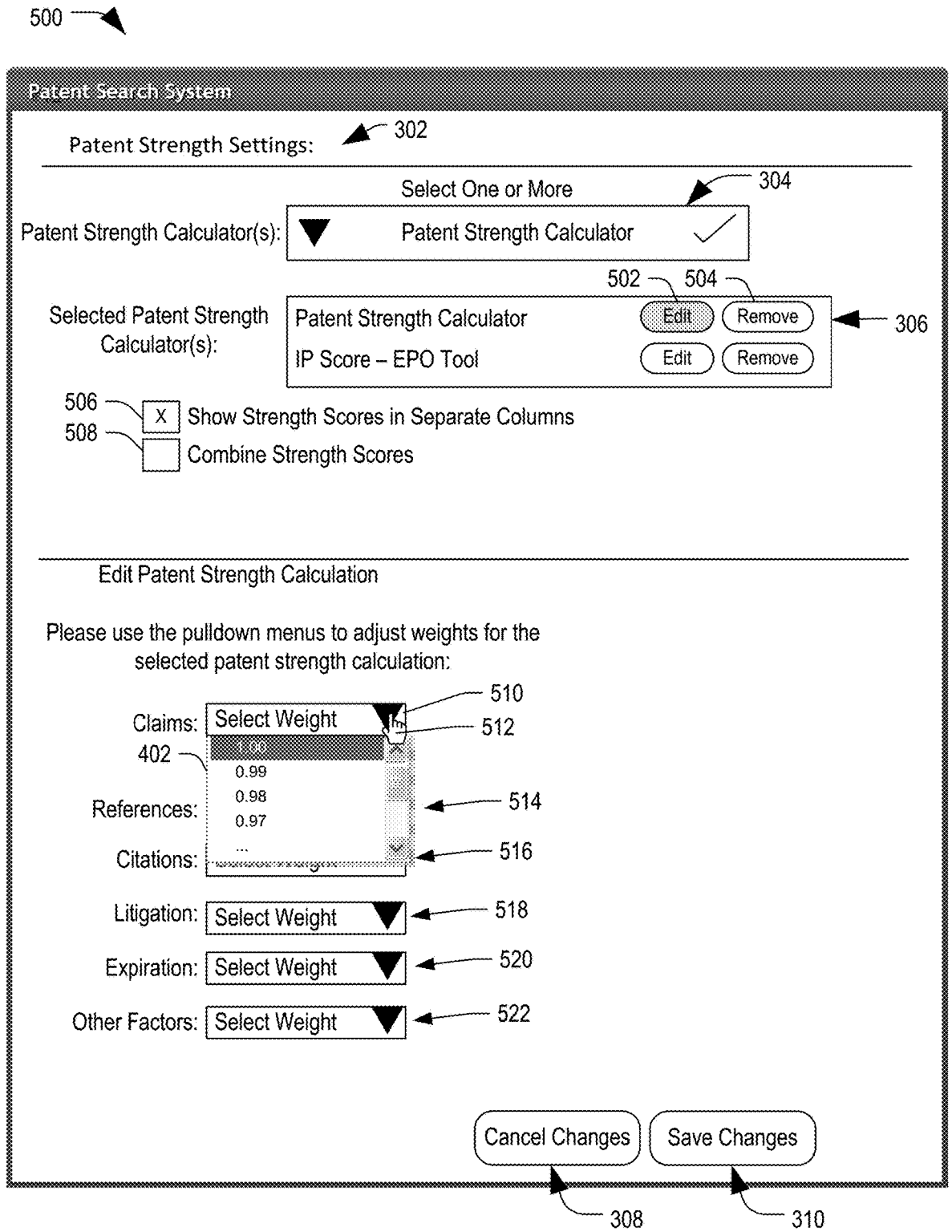
FIG. 5 is a diagram of a GUI including user-selectable elements accessible by a user to edit parameters of a selected patent strength calculator according to some embodiments.

FIG. 5 is a diagram of a GUI 500 including user-selectable elements accessible by a user to edit parameters of a selected patent strength calculator according to some embodiments. The GUI 500 may include user-selectable elements (pull-down menu 304, and check boxes 308 and 310. Further, GUI 500 includes a text box 306 to display the selected patent strength calculators. In some embodiments, GUI 500 includes an edit button 502 and a remove button 504 associated with each of the selected patent strength calculators so that the user may selectively modify the relative weights given to the various attributes of the selected patent strength calculator.

In some embodiments, in response to selecting edit button 402, the GUI 500 may present user-selectable options for modifying the selected patent strength calculator. In some embodiments, the user-selectable options may include pull-down menus 510, 514, 516, 518, 520, and 522 to adjust a relative weight attributed to the claims, the references, the citations, the litigation, the expiration, and other factors data, respectively, that may be used for the particular calculation of the patent strength score. In the illustrated example, arrow 514 points to a pull-down menu that is covered by the expanded menu. As a default, each factor may be given a weight of 1.00, and the relative weight may be adjusted selectively from the default value. In the illustrated example, the user may move a pointer 512 to the down arrow of the pull-down menu 510 to access the menu list 506. In this example, the selected weight 508 has a value of 1.00, but the user may adjust the relative weights of selected ones of the various attributes of the selected patent strength calculator to produce a customized patent strength calculation.

Once the changes are made to the user's satisfaction, the user may click the save changes button 314. In response to clicking the save changes button 314, the GUI may prompt the user to name the customized patent strength calculator and to upload the customized patent strength algorithm to the customized patent strength algorithms 120 to the memory 112 of the analytics system 102 (in FIG. 1), which may store the customized patent strength algorithms 120 and the user settings 124 in memory 112. Subsequently, the selected ones of the patent strength algorithms 118 and the customized patent strength algorithms 120 may be applied to the documents and the results and scores may be presented within the GUI according to the user settings 124.

In some embodiments, the customized patent strength calculator may be stored in memory under the same name. In some embodiments, a text field may be presented upon the user clicking the save changes button 314 in which the user may name the customized patent strength calculator. Thus, the user may generate multiple patent strength calculators that may weight various attributes for different applications.

While the illustrated examples depict pull-down menus, check boxes, and text boxes, it should be appreciated that the options for customizing the patent strength calculations may be more complicated, depending on the implementation. In some embodiments, the GUI may include user-selectable elements that allow the user to select particular patent attributes, define ranges, and assign weights in order to generate a customized patent strength calculator. Other GUIs are also possible, which may allow a user to generate customized patent strength calculations.

Figure 6:
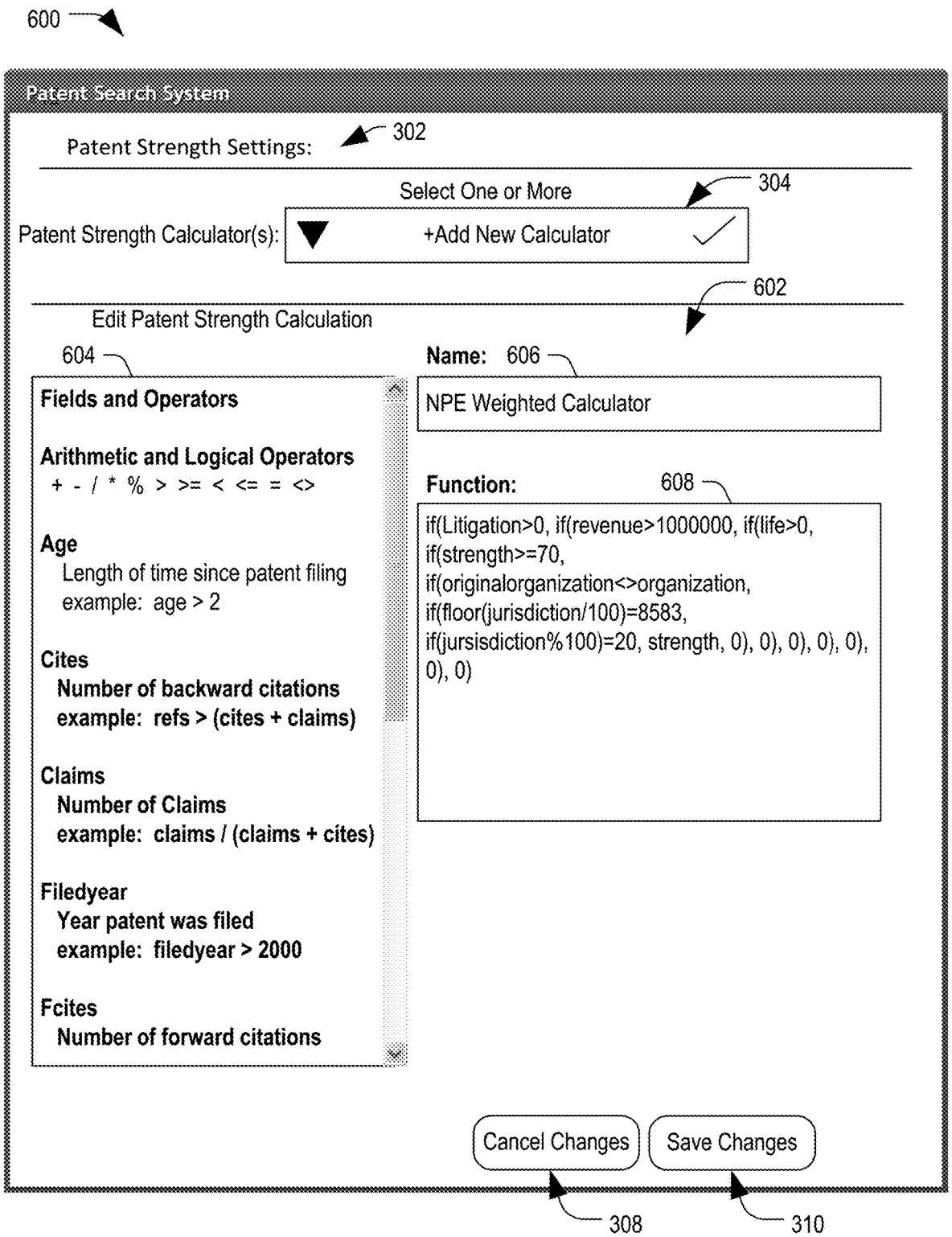
FIG. 6. is a diagram of a GUI including user-selectable elements accessible by a user to define a custom patent strength calculator according to some embodiments.

FIG. 6. is a diagram of a GUI 600 including user-selectable elements accessible by a user to define a custom patent strength calculator according to some embodiments. The GUI 600 may include a pull-down menu 304 that includes an "Add New Calculator" option, which is selected in the illustrated example. In response to selecting the "Add New Calculator" option, the GUI 600 presents an Edit Patent Strength Calculation panel 602 including a list of fields and operators 604, a text field 606 for the user to enter a name for the new calculator (here the patent strength calculator is labeled "NPE Weighted"), and a function field 608 to capture a user-defined function. The GUI 600 allows the user to define a custom patent strength function.

While variables for the determination of monetary value for patents are widely debated, there exists a general believe that ranking and predictive algorithms can be used to narrow the document space and to reduce errors. The GUI 600 allows the user to design a custom patent strength algorithm to reflect a personal or business investment theory that fits the user's perspective. The GUI 600 may be accessed to devise a customized formula for evaluating patent strength. In some embodiments, the GUI 600 in conjunction with the analytics system 102 may utilize in-memory databases, curated data, over twenty variables, and over twenty math and logic operators to provide opportunities for users to define their own patent strength calculators, which can be applied to the documents to produce patent strength scores.

Further, the system 100 allows the user to utilize multiple approaches and to model them in a single platform to instantly compare and cross-validate the customized models against existing models. Further, the user may access the GUI 600 to edit the algorithms to reflect a proprietary patent strength thesis. Further, the system 100 allows the user to run regression analysis on the user's own set of patents that the user believes to be valuable in order to identify attributes and benchmarks that can predictively identify other valuable patents.

The GUI 600 may be used to define a plurality of custom patent strength calculators. In an example, a user may define a plurality of custom patent strength calculators, which can be subsequently used for real-time analysis of a set patents. Such custom patent strength calculators may determine strongest patents by likelihood of being litigated, based on likelihood of being licensed, by most necessary to be maintained, and so on, to find undervalued patents to purchase, to locate a competitor's strongest patents in negotiations, to identify critical assets to validate during maintenance, and various other scenarios.

In some embodiments, the analytics system 102 may produce a GUI that can display information for each patent based on its attributes with benchmarks and comparisons against other patent's averages. Further, the analytics system 102 may support basic citation analysis (backward, forward, recursive forward/backward up to a number of recursions, such as three or more). The analytics system 102 may also perform regression analysis on litigated patents to determine what makes them different from non-litigated patents, which factors may be applied to other patents to predictively find non-litigated patents that may be good candidates for litigation in the future. The GUI 600 provided by the analytics system 102 may allow a user to device new algorithms so that the user does not have to choose between the algorithm and the platform that executes the algorithm. Further, the user may go to a single tool to perform multiple analyses without having to change platforms or use multiple niche applications.

Additionally, the analytics system 102 may operate on data within the analytics system 102 as well as proprietary data available to the user. Users may have internal data that allows them to solve for different problems (e.g., licensed patents, settlements, product information, etc.), which may be included in the analysis to provide a ranking algorithm that can reflect all of the information at the user's disposal. Such additional information may be processed as an additional data source by a local analytics component (not shown), which can capture, correlate and present the proprietary data with the data provided by search engines 116.

Figure 7:
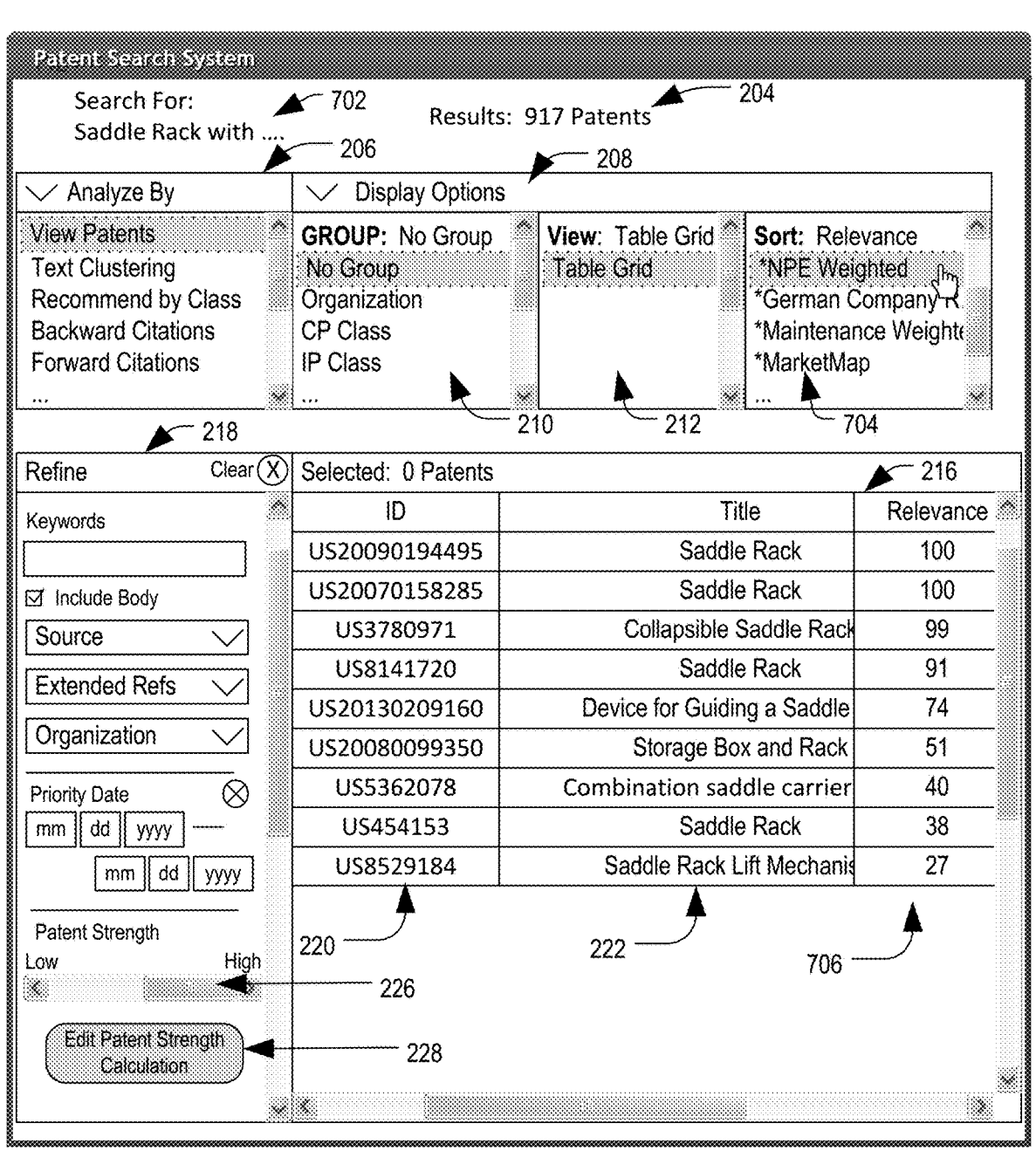
FIG. 7 is a diagram of a GUI including user-selectable elements accessible by a user to sort a list of documents according to the custom patent strength calculator of FIG. 6.

FIG. 7 is a diagram of a GUI 700 including user-selectable elements accessible by a user to sort a list of documents according to the custom patent strength calculator of FIG. 6. The GUI 700 includes all of the features of GUI 200 of FIG. 2. Additionally, the GUI includes a Sort panel 704, which includes customized patent score calculators. Unlike default calculators, the customized patent score calculators are denoted by an asterisk "*" in front of the name.

In the illustrated example, column 706 depicts the documents within Results panel 216 according to a relevance sort (decreasing). However, the user can adjust the sort order within the Results patent 216 based on one of the patent strength calculators (in this example, the "*NPE Weight" calculator). Once selected, the GUI 700 may present the documents within Results panel 216 according to the selected patent strength calculator.

Figure 8:
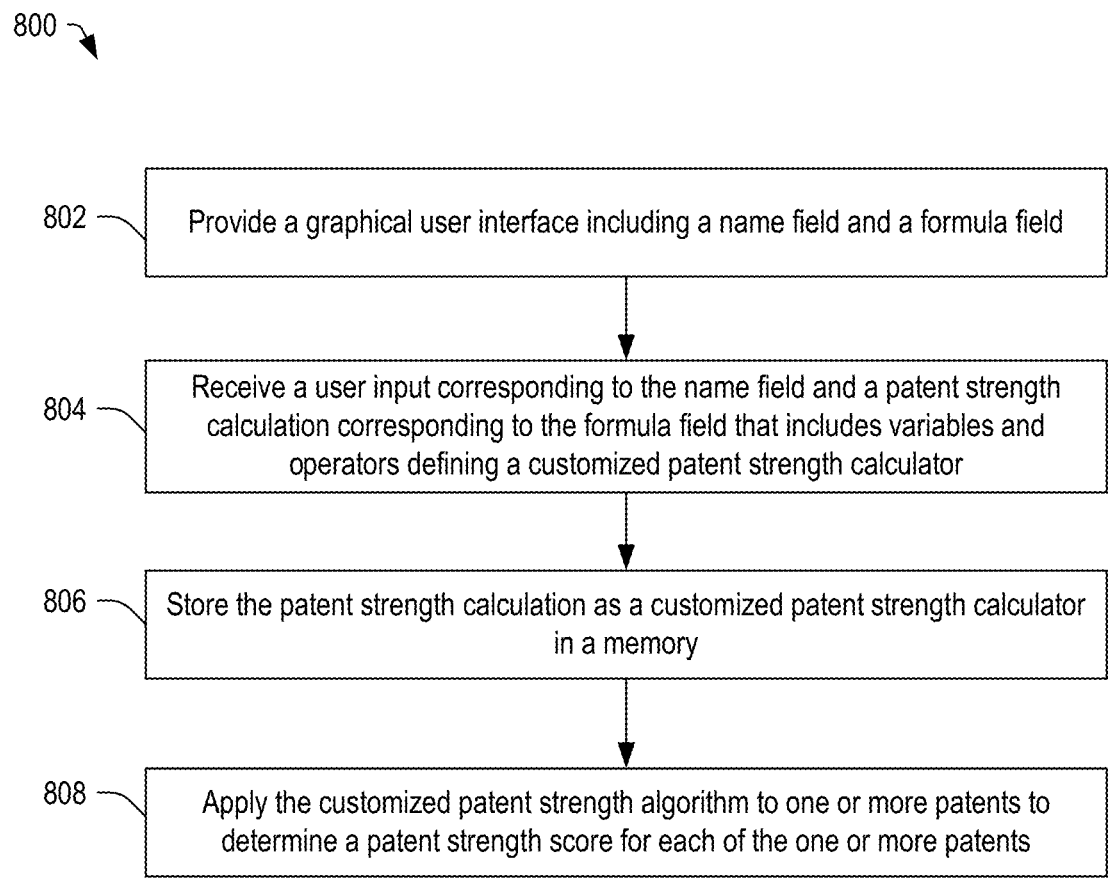
FIG. 8 is a flow diagram of a method of producing a custom patent strength algorithm according to some embodiments.

FIG. 8 is a flow diagram of a method 800 of producing a custom patent strength algorithm according to some embodiments. At 802, a GUI including a name field and a formula field may be provided by the system, such as the GUI 700 from the analytics system 102. Advancing to 804, the system may receive a user input corresponding to the name field and a patent strength calculation including variables and operators defining a customized patent strength calculator corresponding to the formula field. The patent strength calculation can include conditional statements as well as operators to define a formula for calculating the strength of a particular patent document.

Continuing to 806, the patent strength calculation is stored as a customized patent strength calculator in memory. Proceeding to 808, the customized patent strength calculator is applied to one or more patents to determine a patent strength score for each of the one or more patents.

Figure 9:
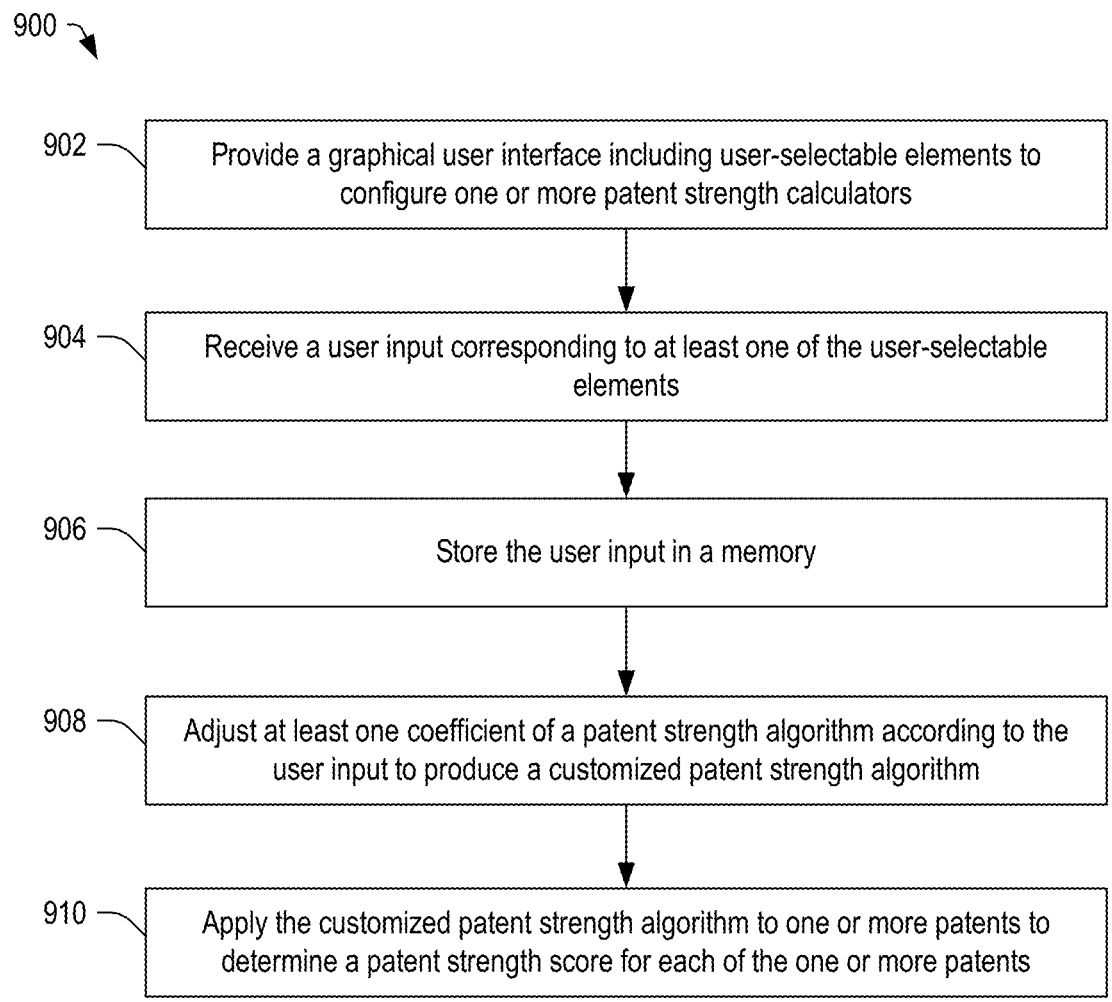
FIG. 9 is a flow diagram of a method of determining a patent strength score based on a customized patent strength algorithm according to some embodiments.

FIG. 9 is a flow diagram of a method 900 of determining a patent strength score based on a customized patent strength algorithm according to some embodiments. At 902, a graphical user interface is provided that includes user-selectable elements to configure one or more patent strength calculators. The user-selectable elements may include buttons, pull-down menus, text boxes, check boxes, and other input elements. Advancing to 904, a user input is received that corresponds to at least one of the user-selectable elements. The user-selectable elements may include a pull-down menu, such as one of the pull-down menus 510, 514, 516, 518, 520, and 522 in FIG. 5.

Continuing to 906, the system stores the user input in a memory, such as memory 112 in FIG. 1. Advancing to 908, at least one coefficient of a patent strength algorithm may be adjusted according to the user input to produce a customized patent strength algorithm. Continuing to 910, the customized patent strength algorithm is applied to one or more patents to determine a patent score for each of the one or more patents.

In some embodiments, the user changes may be provided to the analytics system 102 and the system may update the patent strength calculator according to the changes. In some embodiments, the user changes may be implemented within the GUI and the adjusted patent strength calculator may be provided to the analytics system 102 for storage in the memory 112.

Figure 10:
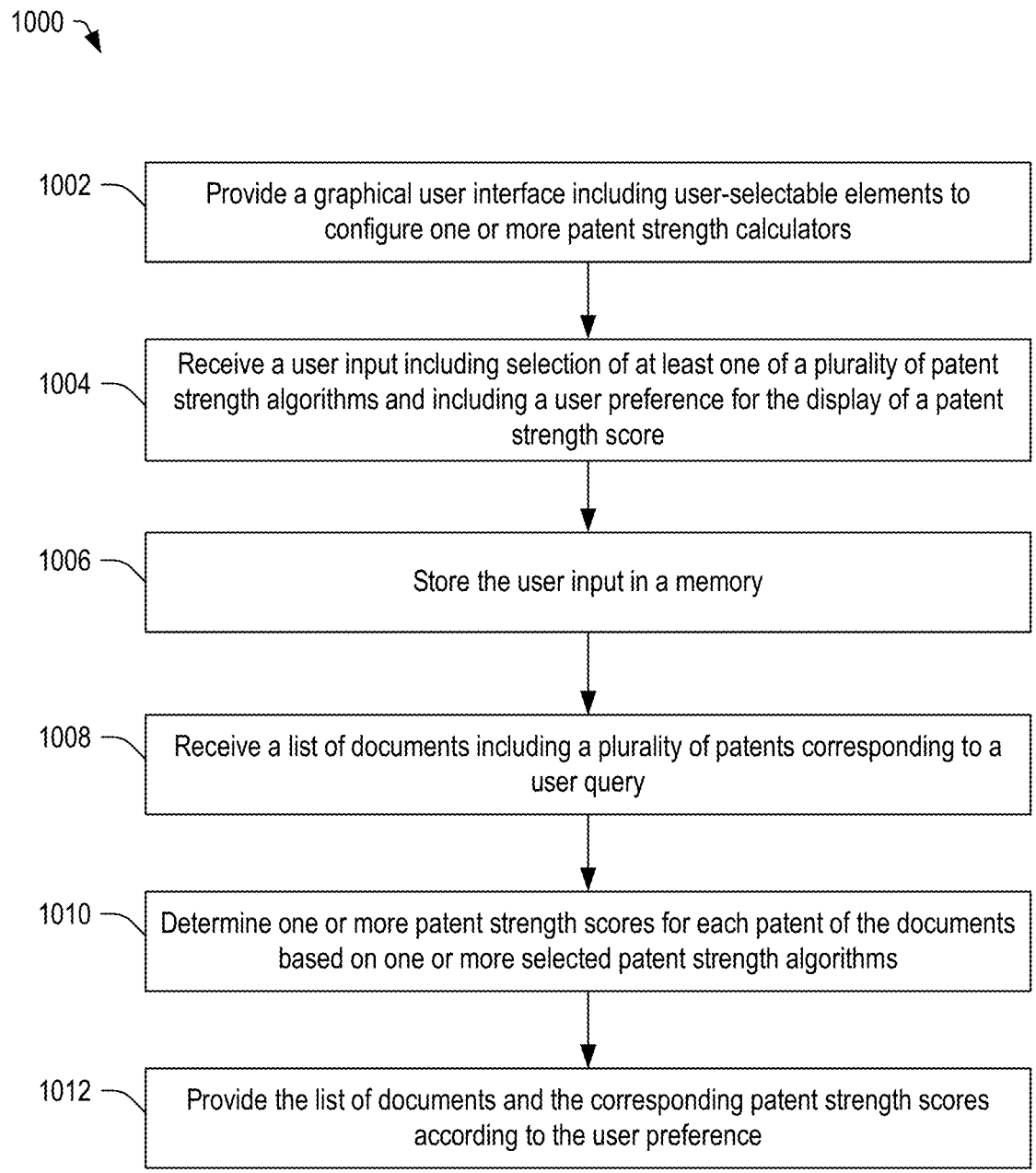
FIG. 10 is a flow diagram of a method of providing a list of documents and corresponding patent strength scores based on user preferences according to some embodiments.

FIG. 10 is a flow diagram of a method 1000 of providing documents and corresponding patent strength scores based on user preferences according to some embodiments. At 1002, a graphical user interface is provided that includes user-selectable elements to configure one or more patent strength calculators. The user-selectable elements may include buttons, pull-down menus, text boxes, check boxes, and other input elements. Advancing to 1004, a user input is received that includes selection of at least one of a plurality of patent strength algorithms and including a user preference for the display of a patent strength score, such as by accessing the pull-down menu 304.

Continuing to 1006, the system stores the user input in a memory, such as memory 112 in FIG. 1. Moving to 1008, the system receives a list of documents including a plurality of patents. In some embodiments, the documents may be uploaded as a list or otherwise retrieved. Continuing to 1010, one or more patent strength scores are determined for each patent of the documents based on the one or more selected patent strength algorithms. Proceeding to 1012, the list of documents and the corresponding patent strength scores may be provided according to the user's preferences (within a GUI).

In accordance with various embodiments, GUIs and methods described herein may be implemented as one or more software programs running on a computing device, such as a personal computer or a smart phone. Further, the methods described herein may be implemented as a computer readable storage medium (storage device or memory device) that provides a non-volatile storage structure for storing instructions that when executed cause a processor to perform the methods.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A search system comprising:
an interface configured to communicate with one or more data sources through a network;
a processor coupled to the interface; and
a memory accessible to the processor, the memory including user settings and instructions that, when executed, cause the processor to:
provide a graphical user interface (GUI) including a plurality of user-selectable elements accessible by a user to configure a patent strength calculator;
receive user input corresponding to at least one of the plurality of user-selectable elements to provide a customized patent strength calculator; and
store the customized patent strength calculator in the memory and associate the customized patent strength calculator with the user settings of the user for subsequent use;
the GUI further including:
a first user-selectable element of the plurality of user-selectable elements accessible by the user to concurrently select multiple patent strength calculators of the plurality of patent strength calculators enabling the concurrent display of generated results of application of the multiple patent strength calculators.

2. The search system of claim 1, further comprising instructions that, when executed, cause the processor to provide a search interface including a second plurality of user-selectable elements accessible by the user to initiate a search for a plurality of patent documents.

3. The search system of claim 2, further comprising instructions that, when executed, cause the processor to:
subsequently, in response to initiating the search, receive a list of patent documents;
apply the customized patent strength calculator to the list to determine a patent strength score for each patent document of the list; and
provide a second GUI including at least a portion of the list such that an order of the patent documents in the portion of the list are arranged according to the patent strength score.

4. The search system of claim 3, wherein the second GUI includes the patent strength score for each patent document of the list.

5. The search system of claim 1, wherein the plurality of user-selectable elements includes at least one of a text input, a slider bar, a check box, a button, a clickable graphic, and a pull-down menu.

6. The search system of claim 1, wherein the GUI includes:
a second user-selectable element of the plurality of user-selectable elements accessible by the user to select the patent strength calculator from a plurality of patent strength calculators; and
a third user-selectable element of the plurality of user-selectable elements accessible by the user to alter one or more factors of the patent strength calculator to provide the customized patent strength calculator.

7. The search system of claim 1, wherein the memory further includes instructions that, when executed, cause the processor to apply the multiple selected patent strength calculators to a list of patent documents to determine multiple patent strength scores for each patent of the list of patent documents.

8. The search system of claim 7, wherein the memory further stores instructions that, when executed, cause the processor to provide a second GUI including the list of patent documents and the multiple patent strength scores for each patent of the list of patent documents.

9. The search system of claim 7, wherein the memory further stores instructions that, when executed, cause the processor to:
generate a composite score from the multiple patent strength scores for each patent of the list of patent documents; and
provide a second GUI including the list of patent documents and the composite score for each patent of the list of patent documents.

10. The search system of claim 1, wherein the plurality of user-selectable elements includes at least one element accessible by the user to add a new patent strength calculator.

11. The search system of claim 1, wherein the GUI further includes another user selectable element accessible by the user to share the custom patent strength calculator with a second user.

12. A search system comprising:
a processor; and
a memory accessible to the processor and storing user settings corresponding to a plurality of users, the memory including instructions that, when executed, cause the processor to:
determine first user settings associated with a user from the user settings stored in the memory;
retrieve a plurality of patent strength calculators associated with the user;
provide a graphical user interface (GUI), the GUI configured to concurrently display multiple ones of the plurality of patent strength calculators that are selected by the user and that enable calculation and concurrent display of multiple respective patent strength scores for each entry in a list of patent documents, and the GUI including a first user-selectable option accessible by a user to access a formula associated with a selected patent strength calculator of the plurality of patent strength calculators;
receive a user input corresponding to the first user-selectable option to produce a custom patent strength calculator based on the patent strength calculator in response to the user input; and
receive a second input corresponding to a second user-selectable option of the GUI to share the custom patent strength calculator with a second user.

13. The search system of claim 12, further comprising an interface coupled to the processor and configured to communicate with one or more data sources through a network.

14. The search system of claim 12, further comprising instructions that, when executed, cause the processor to store the customized patent strength calculator in the memory and associate the customized patent strength calculator with user settings of the user for subsequent use.

15. The search system of claim 12, wherein the GUI includes:
a third user-selectable option accessible by the user to select multiple patent strength calculators of the plurality of patent strength calculators, and
wherein the memory further includes instructions that, when executed, cause the processor to apply the multiple selected patent strength calculators to the list of patent documents to determine multiple patent strength scores for each patent of the list of patent documents.

16. The search system of claim 15, wherein the memory further stores instructions that, when executed, cause the processor to provide a second GUI including the list of patent documents and the multiple patent strength scores for each patent of the list of patent documents.

17. The search system of claim 15, wherein the memory further stores instructions that, when executed, cause the processor to:
generate a composite score from the multiple patent strength scores for each patent of the list of patent documents; and
provide a second GUI including the list of patent documents and the composite score for each patent of the list of documents.

18. A search system comprising:
an interface configured to communicate with one or more data sources through a network;
a processor coupled to the interface; and
a memory accessible to the processor and storing instructions that, when executed, cause the processor to:
provide a graphical user interface (GUI) including a plurality of user-selectable options including:

a first user-selectable option accessible by a user to select one or more of a plurality of patent strength calculators,
  the GUI configured to concurrently display multiple ones of the plurality of patent strength calculators that are selected by the user and that enable calculation and concurrent display of multiple respective patent strength scores for each entry in a list of patent documents;
a second user-selectable option accessible by the user to configure a patent strength calculator to produce a customized patent strength calculator;
a third user-selectable option accessible by the user to create a new patent strength calculator; and
a fourth user-selectable option accessible by the user to share at least one of the customized patent strength calculator and the new patent strength calculator.

19. The search system of claim 18, further comprising instructions that, when executed, cause the processor to:
  provide a search interface including a second plurality of user-selectable option accessible by the user to initiate a search for a plurality of patent documents;
  in response to receiving data to initiate the search, retrieve the list of patent documents;
  apply a selected patent strength calculator of the plurality of patent strength calculators to the list to determine a patent strength score for each patent document of the list; and
  provide a second GUI including at least a portion of the list such that an order of the patent documents in the portion of the list are arranged according to the patent strength score.

20. The system of claim 18, wherein the memory further stores instructions that, when executed, cause the processor to:
  receive data related to the first user-selectable option, the data including multiple selections of patent strength calculators from the plurality of patent strength calculators;
  apply the multiple selected patent strength calculators to the list of patent documents to determine multiple patent strength scores for each patent of the list of patent documents; and
  provide a second GUI including the list of patent documents and the multiple patent strength scores for each patent of the list of patent documents.

* * * * *

UNITED STATES PATENT AND TRADEMARK OFFICE
CERTIFICATE OF CORRECTION

PATENT NO. : 11,188,205 B2
APPLICATION NO. : 16/154305
DATED : November 30, 2021
INVENTOR(S) : Stading et al.

Page 1 of 1

It is certified that error appears in the above-identified patent and that said Letters Patent is hereby corrected as shown below:

In the Specification

In Column 1, Line 24, delete "(COA)" and insert -- (COA)" --.

In Column 2, Line 25, delete "FIG. 6." and insert -- FIG. 6 --.

In Column 7, Line 39, delete "(such" and insert -- such --.

In Column 8, Lines 17-18, delete "PATENTSTRENGTH™" and insert -- PATENT STRENGTH™ --.

In Column 8, Lines 59-60, delete "(pull-down" and insert -- pull-down --.

In Column 9, Line 51, delete "FIG. 6." and insert -- FIG. 6 --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*